(12) United States Patent
Gill et al.

(10) Patent No.: US 7,783,839 B2
(45) Date of Patent: Aug. 24, 2010

(54) USING DIFFERENT ALGORITHMS TO DESTAGE DIFFERENT TYPES OF DATA FROM CACHE

(75) Inventors: Binny Sher Gill, Auburn, MA (US); Michael Thomas Benhase, Tucson, AZ (US); Joseph Smith Hyde, II, Tucson, AZ (US); Thomas Charles Jarvis, Tucson, AZ (US); Bruce McNutt, Tucson, AZ (US); Dharmendra Shantilal Modha, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 671 days.

(21) Appl. No.: 11/621,057

(22) Filed: Jan. 8, 2007

(65) Prior Publication Data

US 2008/0168220 A1 Jul. 10, 2008

(51) Int. Cl.
*G06F 12/00* (2006.01)
(52) U.S. Cl. .............. 711/143; 711/100; 711/113; 711/119; 711/133; 711/163
(58) Field of Classification Search ............... 711/100, 711/113, 119, 133–134, 142–143, 159–160, 711/163
See application file for complete search history.

(56) References Cited

U.S. PATENT DOCUMENTS

| | | | |
|---|---|---|---|
| 5,581,724 A | 12/1996 | Belsan et al. | |
| 6,425,050 B1 | 7/2002 | Beardsley et al. | |
| 6,785,771 B2 | 8/2004 | Ash et al. | |
| 2003/0028724 A1 | 2/2003 | Kedem | |
| 2003/0070041 A1 | 4/2003 | Beardsley et al. | |
| 2003/0140198 A1 | 7/2003 | Ninose et al. | |
| 2003/0158869 A1 | 8/2003 | Micka | |
| 2004/0255026 A1 | 12/2004 | Blount et al. | |
| 2005/0071550 A1 | 3/2005 | Lowe et al. | |
| 2006/0107016 A1 | 5/2006 | Murotani et al. | |
| 2007/0156961 A1 | 7/2007 | Houzenga et al. | |
| 2008/0040553 A1* | 2/2008 | Ash et al. ............ | 711/133 |

OTHER PUBLICATIONS

B.S.Gill et al., "WOW: Wise Ordering for Writes—Combining Spatial and Temporal Locality in Non-Volatile Caches", IBM, USENIX File and Storage Technologies (FAST), Dec. 13-16, 2005, San Francisco, CA, pp. 1-14.
"What is RAID 5?", Microsoft Windows, [online] [retrieved Sep. 27, 2006] http://www.commodore.ca/windows/raid5/raid5.htm, pp. 1-7.
U.S. Patent Application entitled "Using Multiple Data Structures to Manage Data in Cache", U.S. Appl. No. 11/459,004, filed Jul. 20, 2006, by inventors D.S. Modha, B.S. Gill, M.T. Benhase and J.S. Hyde II.

(Continued)

*Primary Examiner*—Jasmine Song
(74) *Attorney, Agent, or Firm*—David W. Victor; Konrad Raynes & Victor LLP

(57) ABSTRACT

Provided are a method, system, and article of manufacture for using different algorithms to destage different types of data from cache. A first destaging algorithm is used to destage a first type of data to a storage for a first duration. A second destaging algorithm is used to destage a second type of data to the storage for a second duration.

18 Claims, 8 Drawing Sheets

OTHER PUBLICATIONS

U.S. Patent Application entitled "Wise Ordering for Writes—Combining Spatial and Temporal Locality in Write Caches", U.S. Appl. No. 11/384,939, filed Mar. 20, 2006, by inventors D.S. Modha and B.S. Gill.

U.S. Patent Application entitled "Wise Ordering for Writes—Combining Spatial and Temporal Locality in Write Caches for Multi-Rank Storage", U.S. Appl. No. 11/384,890, filed Mar. 20, 2006, by inventors D.S. Modha and B.S. Gill.

U.S. Patent Application entitled "Managing Write Requests in Cache Directed to Different Storage Groups", Serial No. unknown, filed Jan. 5, 2007 by inventors B. S. Gill, M.T. Benhase, J.S. Hyde II, T.C. Jarvis, B.McNUTT, and D.S. Modha.

PCT International Search Report and Written Opinion dated Apr. 21, 2008 for Application No. PCT/EP2007/064234 filed Dec. 19, 2007.

A. Varma et al., "Destage Algorithms for Disk Arrays with Non-Volatile Caches", ACM, 1995, pp. 83-95.

M. Alonso et al., A New Destage Algorithm for Disk Cache: DOME, euromicro, p. 1416, 25th Euromicro Conference (EUROMICRO '99)-vol. 1, 1999.

* cited by examiner

Cache Index Entry

Storage Group List Entry

Storage Group Information

Cache Information

Storage Group Destage Information

USING DIFFERENT ALGORITHMS TO DESTAGE DIFFERENT TYPES OF DATA FROM CACHE

BACKGROUND OF THE INVENTION

1. Field of the Invention

The present invention relates to a method, system, and article of manufacture for using different algorithms to destage different types of data from cache.

2. Description of the Related Art

A cache management system returns complete to a write request when the received write data directed to a storage device is written to cache and before the write data is written out to the storage device, such as a hard disk drive. The write latency to the storage device is typically significantly longer than the latency to write to a cache memory. Consequentially, returning complete before the write data is written to the storage device reduces write latency and returns complete faster than if complete is returned after writing the data to the storage device.

A cache management system may maintain a linked list having one entry for each data unit stored in the cache, which may comprise write data buffered in cache before writing to the storage device or read data. In the commonly used Least Recently Used (LRU) cache technique, if data in the cache is accessed, i.e., a cache "hit", then the entry in the LRU list for the accessed data is moved to a Most Recently Used (MRU) end of the list. If the requested data is not in the cache, i.e., a cache miss, then the data in the cache whose entry is at the LRU end of the list may be removed (or destaged back to storage) and an entry for the new data staged into cache is added to the MRU end of the LRU list. With this LRU cache technique, data that is more frequently accessed is likely to remain in cache, while data less frequently accessed will more likely be removed from the LRU end of the list to make room in cache for newly accessed data.

The LRU cache technique seeks to optimize for temporal locality so as to destage data that is least likely to be rewritten soon in order to minimize the number of destage operations, i.e., if a write that is not destaged is overwritten than the destaging of the overwritten write is avoided, thus saving the time and effort of writing the data from cache to disk. On the other hand there is also a desire to destage in a manner that exploits spatial locality, which means that data is written to storage locations that are closest to each other to minimize the distance the storage device write mechanism and storage media needs to be moved to reach the next storage location to write.

One technique for exploiting both temporal and spatial locality is the Wise Ordering for Writes (WOW) algorithm. The WOW algorithm employs a circular linked list or clock where the circular linked list has one entry for each write request buffered in cache. The entries are ordered in the linked list according to the storage location to which the associated write request is directed to exploit the benefits of spatial locality. Further, each entry includes a bit indicating whether the write data for the storage location in the cache has been recently updated. The bit for an entry is set when the write data for the entry is updated. A pointer points to a current entry in the circular linked list. A task using the WOW algorithm accesses an entry addressed by the pointer. If the bit for the entry indicates that the data for the entry in cache has been recently updated, then the bit is set to indicate that the write data has not been recently updated and the pointer incremented to point to the next entry so that the entry having write data to a storage location next closest in spatial proximity to the previously written storage location is considered. The entry is selected to write that is closest in spatial proximity to the last written storage location and whose bit indicates that the write data for the entry has not recently been updated.

Thus, with the WOW algorithm, spatial locality is exploited because a next entry to write is selected for consideration that is closest in spatial proximity to the last destaged write request. Further, temporal locality is exploited because an entry that has recently been written will be skipped until the pointer circles back to that skipped entry to consider.

SUMMARY

Provided are a method, system, and article of manufacture for using different algorithms to destage different types of data from cache. A first destaging algorithm is used to destage a first type of data to a storage for a first duration. A second destaging algorithm is used to destage a second type of data to the storage for a second duration.

In a further embodiment, the duration comprises a number of destage operations.

In a further embodiment, a determination is made of a first number of tasks to assign to execute the first destaging algorithm to destage the first type of data, wherein the first duration is calculated using the first number of tasks. A determination is also made of a second number of tasks to assign to execute the second destaging algorithm to destage the second type of data, wherein the second duration is calculated using the second number of tasks.

In a further embodiment, the determined first and second number of tasks are used to determine a derivative number of tasks used to execute the first destaging algorithm for the first duration to destage the first type of data and to execute the second destaging algorithm for the second duration to destage the second type of data.

In a further embodiment, the first type of data comprises data written to a volatile memory device and the second type of data comprises data written to a non-volatile memory device.

In a further embodiment, at least one of the first and second destaging algorithms comprises a spatial destaging algorithm that orders write data to destage according to a location on the storage for the write data.

In a further embodiment, a plurality of storage groups are configured in storage, wherein the first type of data is destaged from a first cache to the storage groups in the storage, wherein the second type of data is destaged from a second cache to the storage groups in the storage. The first destaging algorithm comprises a spatial destaging algorithm that determines for each of a plurality of the storage groups, a number of tasks to assign to one of the storage groups based on a percentage occupancy of the first type of data in the first cache to write to the storage group. Each task assigned to one storage group destages the first type of data from the first cache to the storage group.

In a further embodiment, the number of tasks to assign to one storage group is based on the percentage occupancy of the first type of data in the first cache, high and low thresholds with respect to the storage group for the first type of data and a total occupancy of the first cache.

In a further embodiment, the second destaging algorithm implements the spatial destaging algorithm implemented by the first destaging algorithm to determine a number of tasks to assign to the storage groups to destage the second type of data from the second cache to the storage groups.

In a further embodiment, there are first and second durations for the first and second types of data for each of the plurality of storage groups. For each storage group of the plurality of storage groups, the first destaging algorithm is used to determine a first number of tasks to use to destage the first type of data to the storage group, wherein the first duration for the storage group is calculated using the determined first number of tasks for the storage group. The second destaging algorithm is used to determine a second number of tasks to use to destage the second type of data to the storage group, wherein the second duration for the storage group is calculated using the determined second number of tasks for the storage group.

In a further embodiment, determining the first number of tasks for one storage group further comprises using a high and low thresholds for the storage group and a percentage occupancy of the first type of data for the storage group in the first cache. Determining the second number of tasks for one storage group further comprises using a high and low thresholds for the storage group and a percentage occupancy of the second type of data for the storage group in the second cache.

In a further embodiment, the high and low thresholds used for the first cache and first destaging algorithm are higher than the high and low thresholds used by the second cache, and wherein the first cache has greater storage capacity than the second cache.

In a further embodiment, the first and second number of tasks and the first and second durations to use are periodically recalculated in response to an event.

In a further embodiment, the storage comprises at least one Redundant Array of Inexpensive Disks (RAID) array and wherein each storage group comprises a RAID rank.

DETAILED DESCRIPTION

Figure 1:
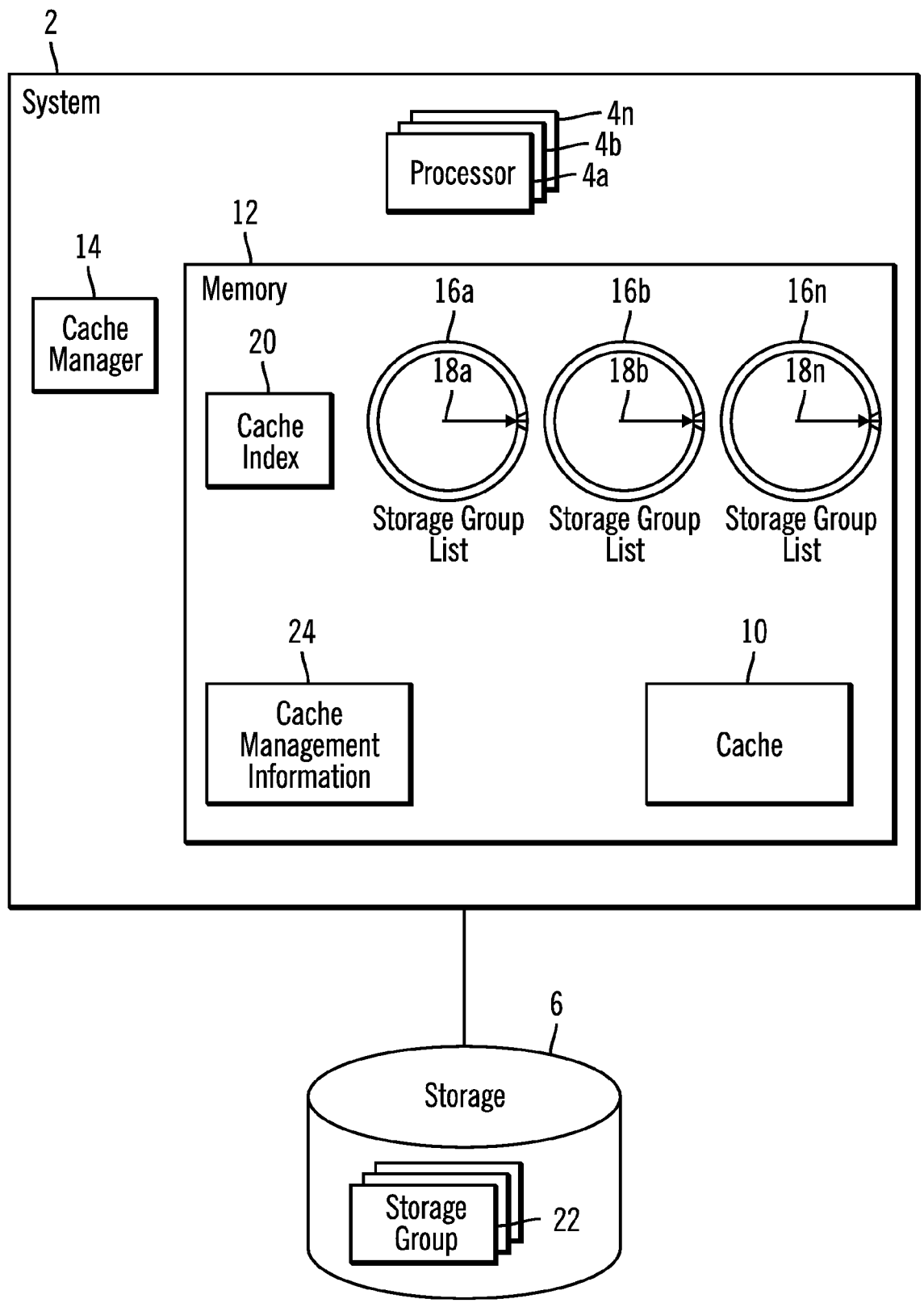
FIG. 1 illustrates an embodiment of a computing environment.

FIG. 1 illustrates an embodiment of a computing environment. A system 2 includes one or more processors 4a, 4b . . . 4n, where each processor 4a, 4b . . . 4n provides processing resources to destage write requests and perform other operations. A cache manager 14 handles the I/O requests and caches write requests directed to the storage 6, which may be received from host systems (not shown) and/or the processors 4a, 4b . . . 4n in a cache 10 portion of memory 12. In response to receiving a write request, the cache manager 14 would return complete to the write request in response to adding the write request to the cache 10. The memory 12 may comprise one or more memory devices used by the processors 4a, 4b . . . 4n to temporarily store data, including volatile and non-volatile memory as well as on-board memory, e.g., L2 cache. The cache 10 comprises that portion of the memory in which write requests are buffered before being destaged to the storage 6.

A cache manager 14 maintains storage group lists 16a, 16b . . . 16n, such as circular lists, clock lists or other data structures, in the memory 12 to manage write requests buffered in the cache 10. Each storage group list 16a, 16b . . . 16n includes a pointer 18a, 18b . . . 18n, such as a clock hand, that addresses an entry in the list 16a, 16b . . . 16n.

The cache manager 14 further maintains a cache index 20 that has information on write requests directed to the storage 6 maintained in the cache 10. The cache index 20 indicates whether data from a particular address or location in the storage 6 is identified in an entry in one of the lists 16a, 16b . . . 16n. A storage address or location may comprise a track, block, page, or any other segment of data in the storage 6.

A cache index 20 provides an index of storage addresses in the storage 6 to entries in one of the lists 16a, 16b . . . 16n for a write request to the storage address. The cache index 20 may comprise a hash table or other suitable index data structure.

The storage 6 may comprise one or more storage devices, such as one or more disk drives, an array of storage devices, such as a Just a Bunch of Disks (JBOD), Direct Access Storage Device (DASD), Redundant Array of Independent Disks (RAID) array, virtualization device, tape storage, flash memory, etc. In one embodiment, the storage 6 is divided into separate storage groups 22. Each storage group 22 may comprise a set of storage devices, such as disk drives, etc. If the storage 6 is configured as a RAID device, then each storage group 22 may comprise a RAID rank. A RAID rank is a group of disks on which a data set is striped across and parity data maintained for the data sets in the rank. Data or parity written to each disk in a RAID rank is referred to as a stripe, where a stripe comprises the consecutive sectors written to a single disk in the rank of storage devices across which data and parity information are written.

The cache manager 14 maintains cache management information 24 including information for each storage group 22 and the cache 10 that is used to manage write requests in the cache 10.

The memory 12 may comprise one or more memory devices that has higher throughput and faster access than the storage 6. In alternative embodiments, the memory 12 and storage 6 may comprise any suitable computer readable media known in the art, such that one computer readable medium functions as a fast access cache to another computer readable medium to which the I/O requests are directed. The processors 4a, 4b . . . 4n may comprise separate microprocessor devices or separate processing cores implemented on one or more multi-core microprocessor devices. The cache manager 14 may be implemented as a computer program executed by one or more of the processors 4a, 4b . . . 4n or implemented in the memory 12 hardware.

In one embodiment, the system 2 may comprise a storage controller receiving read and write requests directed to the storage 6 from multiple connected hosts.

In one embodiment, the cache manager 14 may maintain a separate storage group list 16a, 16b ... 16n for each storage group 22 in the storage 6. In one embodiment, each list 16a, 16b ... 16bn comprises a circular linked list of entries associated with write requests to the storage group 22 in the cache 10. The entries may be sorted by the storage locations in the storage group 22 to which the write request represented by the entry is directed, i.e., to provide spatial locality. The cache manager 14 may spawn tasks, such as threads in the processors 4a, 4b ... 4n, to process one storage group list 16a, 16b ... 16n, where a task would proceed sequentially through the entries in the storage group list 16a, 16b ... 16n in order to destage write requests to storage locations in the storage group 22 that are spatially proximate, i.e., a write request is destaged that is directed to a storage location or address in the storage group 22 that is spatially most proximate to the storage location/address of the previously destaged write request. For certain storage devices, such as hard disk drives or other magnetic storage media, data throughput is optimized by writing data that is the closest to the previously written data to minimize the distance that a write head mechanism or the storage media needs to move, e.g., seek or rotate, to access the next write address.

Figure 2:
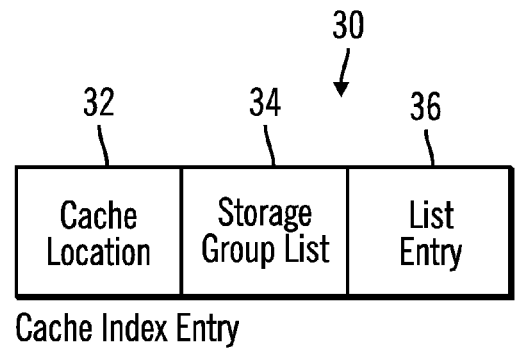
FIG. 2 illustrates an embodiment of a cache index entry used to manage write requests in cache.

FIG. 2 illustrates an embodiment of a cache index entry 30 in the cache index 20, which indicates a cached storage location 32, such as a storage address in one of the storage groups 22; a storage group list 34 identifying the list 16a, 16b ... 16n having the entry for the cached storage location 32; and the entry 36 position in the indicated list 34 for the cached storage location 32.

The cache index 20 may comprise a hash table whose entries are indexed based on a hash of the storage location 32. Alternatively, the cache index 20 may be implemented in suitable index type data structures other than a hash table known in the art.

Figure 3:
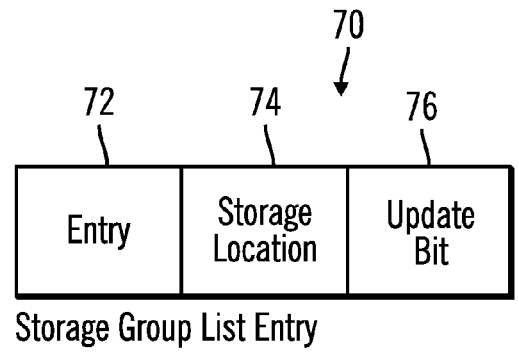
FIG. 3 illustrates an embodiment of an entry in a storage group list.

FIG. 3 illustrates an embodiment of a storage group list entry 70 including an entry number 72 of the entry in the storage group list 16a, 16b ... 16n; a storage location 74 or address in the storage group 22 to which the write request is directed (as mentioned entries in a list 16a, 16b ... 16n may be sorted by storage location/address); and an update bit 76 indicating whether the write request data has been recently updated, i.e., overwritten by a subsequent write request to the same storage location.

Figure 4:
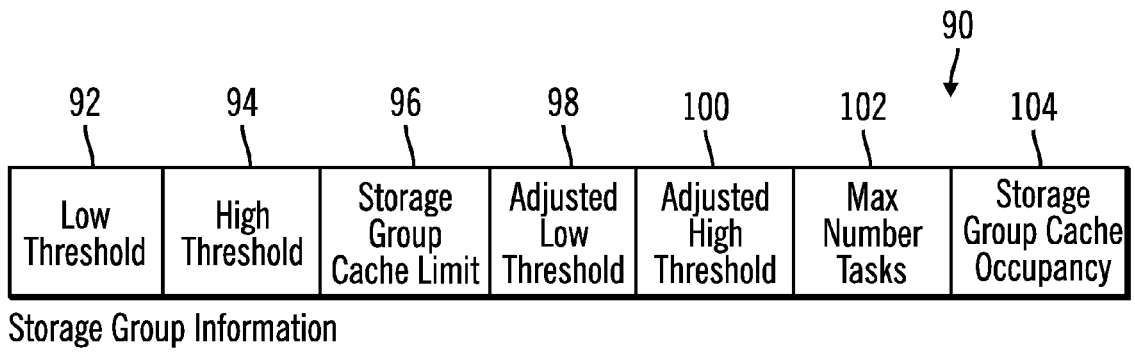
FIG. 4 illustrates an embodiment of storage group information used for cache management.

FIG. 4 illustrates an embodiment of storage group information 90 that the cache manager 14 maintains for each storage group 22. The storage group information 90 for one storage group 22 includes a low threshold 92 and high threshold 94 that may indicate a default percentage or amount of the cache 10 that write requests for the storage group may occupy; a storage group cache limit 96 indicating a maximum amount of the cache 10 that write requests for the storage group may occupy; an adjusted low threshold 98 and adjusted high threshold 100 comprising the result of a factor applied to the low 92 and high 94 thresholds to adjust the thresholds 98 and 100 used during operations based on the total cache 10 utilization; a maximum number of concurrent tasks 102 that may be used to destage write requests for the storage group; and a storage group cache occupancy 104 indicating an amount or percentage of the cache 10 occupied by write requests for the storage group.

In one embodiment, the storage group cache limit 96 may comprise a global value for all storage groups 22, such that no storage group may have an amount or percentage of the write requests in the cache 10 that exceed this global cache limit 96. Further, each storage group high threshold 92 may be set less than or equal to the global cache limit 96. Providing a global cache limit 96 ensures that no single storage group dominates the cache 10, i.e., has write requests that occupy a substantial portion of the cache. If a storage group 22 fails, then the writes to that failed storage group 22 need to be maintained in the cache 10 until they can be destaged. If one single storage group 22 dominated the cache 10 and then failed, then the writes to the failed storage group occupying a substantial portion of the cache may prevent write requests to available storage groups 22 from being added to the cache 10, especially if the workload increases with respect to the available storage groups 22. If a write request cannot be cached, then a completion status cannot be returned to the process or host that initiated that write request.

The adjusted low and high thresholds 98 and 100 are used to throttle or determine the number of concurrent tasks assigned to destage write requests for one storage group. If the occupancy for a storage group 22 is relatively toward the high threshold 100, then the cache manager 14 may tend to increase the number of tasks assigned to that storage group 22 to avoid reaching the threshold. If the storage group 22 occupancy of the cache 10 is relatively toward the low threshold 98, then the cache manager 14 may tend to decrease the number of tasks assigned to that storage group 22 to avoid reaching the low threshold. In certain embodiments, the storage group low threshold is used to ensure that there are a sufficient number of write requests pending in the cache 10 such that writes may be written to spatially proximate storage locations in the storage group 22 to increase the write throughput. Write throughput increases as the number of pending write requests increases because the probability of writes at more proximate locations increases, which reduces the seek time and distance required by the storage device to position a write mechanism and/or the storage media (e.g., disk or tape) to the storage location to write the data.

Figure 5:
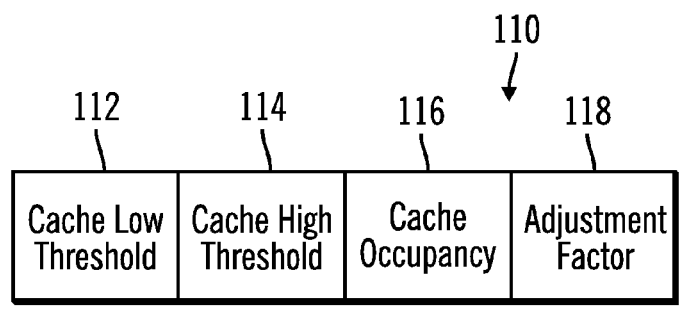
FIG. 5 illustrates an embodiment of cache information used for cache management.

FIG. 5 illustrates an embodiment of cache information 110 that the cache manager 14 maintains to manage the occupancy of the cache 10 as a whole across all storage groups 22. A cache low threshold 112 and high threshold 114 indicate a default percentage or amount of the cache 10 that write requests for all storage groups may occupy; a cache occupancy 116 indicates the amount, e.g., percentage or absolute amount, of write requests occupying the cache 10 for all storage groups 22; and an adjustment factor 118 comprises a dynamically calculated value based on the current cache occupancy 116 that is applied to the storage group low 92 and high 94 thresholds to produce the adjusted low 98 and high 100 thresholds used to determine the number of tasks to allocate to destage writes for the storage groups 22. The adjustment factor 118 may be applied to the thresholds for all or less than all of the storage groups.

In certain embodiments, the adjustment factor 118 may comprise a value between zero and one. If the cache occupancy 116 is relatively toward the cache high threshold 114, then the cache manager 14 may tend to lower the adjustment factor toward zero, which when applied, e.g., multiplied, to the storage group 22 low 92 and high 94 thresholds lowers the thresholds, such as the high threshold. This ensures that a greater number of tasks are allocated to process destage requests for the storage groups, because more tasks are allocated to a storage group as the storage group cache occupancy 104 increases toward the downward adjusted storage group high threshold 100. If the cache occupancy 116 is relatively toward the cache low threshold 112, then the cache manager 14 may tend to increase the adjustment factor to one, which when applied, e.g., multiplied, to the storage group 22 low 92 and high 94 thresholds increases the adjusted thresholds 98 and 100, such as the high threshold 100. This ensures that relatively fewer tasks are allocated to process destage requests for the storage groups because fewer tasks are allocated to a storage group as the storage group cache occupancy 104 is further away from the storage group high threshold 94. By lowering the number of tasks assigned to destage requests, the rate at which destage requests are processed is lowered leading to a gradual increase in the number of pending write requests. As discussed, increasing the number of pending write requests may increase the likelihood that destaged write requests are closer in spatial proximity to improve write throughput at the storage device.

Figure 6:
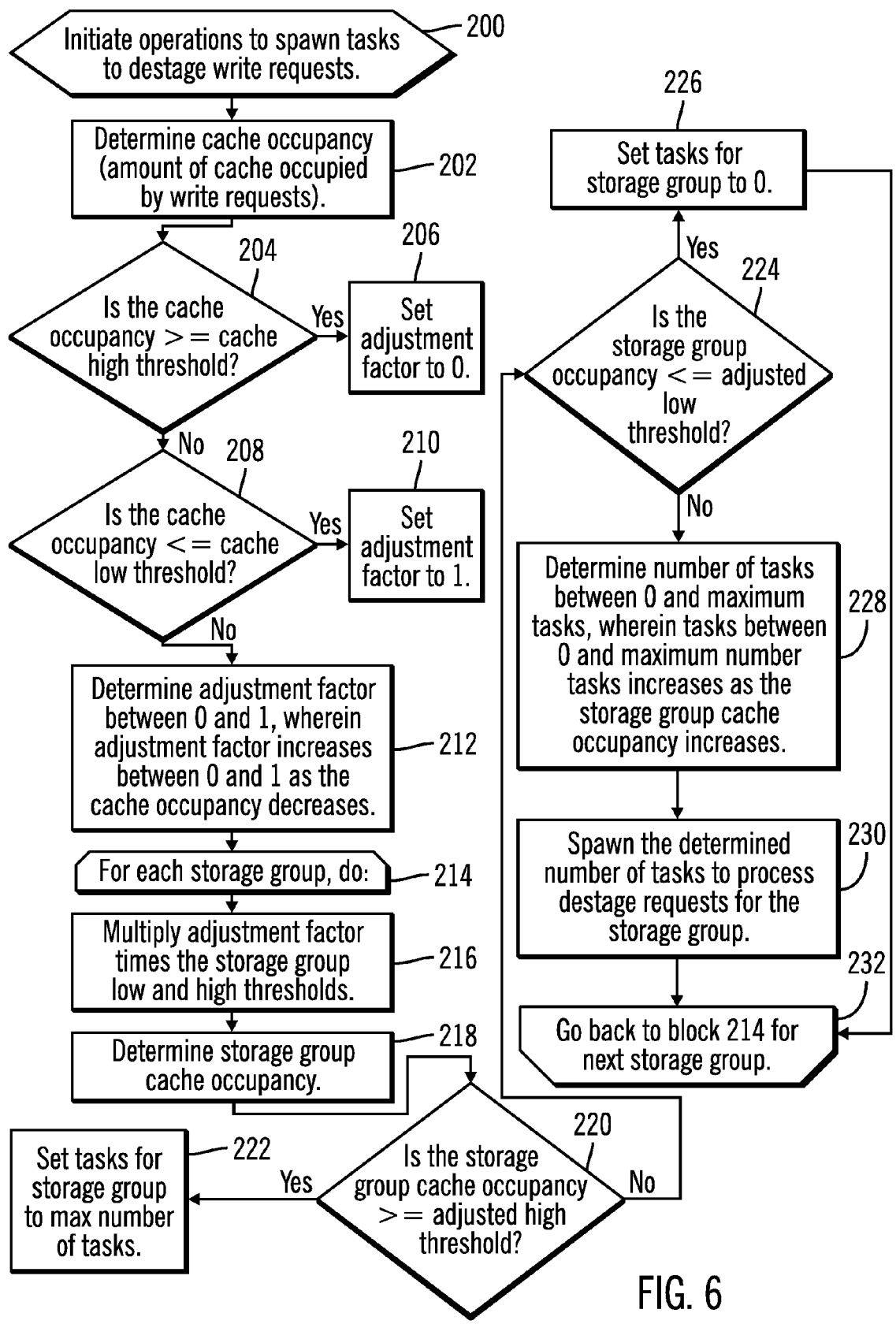
FIG. 6 illustrates an embodiment of operations to determine a number of tasks to use to destage write requests to storage groups in cache.

FIG. 6 illustrates an embodiment of operations performed by the cache manager 14 to spawn tasks to perform destage requests for the write requests identified in the storage group lists 16a, 16b . . . 16n. The operations of FIG. 6 may be initiated periodically, whenever the cache occupancy 116 changes by a specified amount or in response to some other event. Upon initiating the operations (at block 200), the cache manager 14 determines (at block 202) the cache occupancy 116, the amount/percentage of cache 10 occupied by write requests and optionally other information If (at block 204) the cache occupancy 116 is greater than or equal to the cache high threshold 14, then the adjustment factor 118 is set (at block 206) to zero, to maximize the number of tasks spawned to process I/O request in an effort to lower the cache occupancy 116. If (at block 208) the cache occupancy 116 is less than or equal to the cache low threshold 112, then the adjustment factor 118 is set (at block 210) to 1 to relatively reduce the number of tasks spawned to reduce the rate of destage request processing to increase the cache occupancy 116 to improve the spatial locality of write requests buffered in the cache 10.

If the cache occupancy 116 is between the cache low 112 and high 114 thresholds (from the no branch of block 208), then the cache manager 14 determines (at block 212) the adjustment factor 118 between 0 and 1. The adjustment factor 118 may increase between 0 and 1 as the cache occupancy 116 decreases. In one embodiment, the adjustment factor 118 may comprise the percentage distance of the cache occupancy 116 between the cache low 112 and high 114 thresholds, e.g., (cache high threshold 114 minus cache occupancy 116)/(cache high threshold 114 minus cache low threshold 112). Alternative techniques may be used to determine the adjustment factor 118. For instance, a table may provide different adjustment factors 118 between 0 and 1 for different ranges of values between the cache low 112 and high 114 thresholds.

After determining the adjustment factor 118 based on the current cache occupancy 118 with respect to the cache low 112 and high 114 thresholds, the cache manager 14 performs the operations at blocks 214 through 232 for each storage group 22 for which tasks are to be spawned, which may comprise all currently available storage groups 22. At block 216, the cache manager 14 multiplies the adjustment factor 118 times the storage group low 92 and high 94 thresholds to produce the adjusted low 98 and high 100 thresholds for the storage group. The cache manager 14 further determines (at block 218) the storage group cache occupancy 104, e.g., amount or percentage of cache 10 write requests the considered storage group 22 occupies. If (at block 220) the storage group cache occupancy 104 is greater than or equal to the storage group adjusted high threshold 100, then the tasks for the storage group is set (at block 222) to the maximum number of tasks 102 allowed for that storage group. As discussed, each storage group may have the same or different values for the low 92 and high 94 thresholds and maximum number tasks 102. If (at block 224) the storage group cache occupancy 104 is less than or equal to the adjusted low threshold 98, then the cache manager 14 sets (at block 226) the tasks for the storage group to zero to allow the number of pending write requests for the storage group 22 to increase.

If (from the no branch of block 224) the storage group cache occupancy 104 is between the adjusted low 98 and high 100 thresholds, then at block the cache manager 14 determines (at block 228) a number of tasks between 0 and the maximum number tasks 102 allowed for the storage group. The tasks between 0 and the maximum number of tasks 102 increases as the storage group cache occupancy increases and decreases as the storage group cache occupancy decreases. The cache manager 14 then spawns (at block 230) the determined number of tasks to process destage requests for the storage group.

With the described embodiments of FIG. 6, as the overall cache occupancy 116 increases, the storage group thresholds 98 and 100 may be proportionally lowered to increase the number of task spawned for that storage group 22 because the number of tasks to assign to the storage group may proportionally increase as the storage group cache occupancy 104 approaches its adjusted high threshold 100. More tasks are needed as the workload for the storage group and number of pending write requests increase. Likewise, as the overall cache occupancy 116 decreases, the storage group thresholds may be proportionally increased to decrease the number of task spawned for that storage group 22 because the number of tasks to assign to the storage group may proportionally decrease as the storage group cache threshold approaches its adjusted low threshold 98. The number of tasks is reduced to ensure that the number of pending write requests for a storage group does not fall below the storage group adjusted low threshold 98. As discussed, it may be desirable to maintain a certain level of pending write requests in the cache 10 to increase the spatial proximity of the storage locations to which the write requests are directed in order to improve write throughput at the storage devices of the storage.

Figure 7:
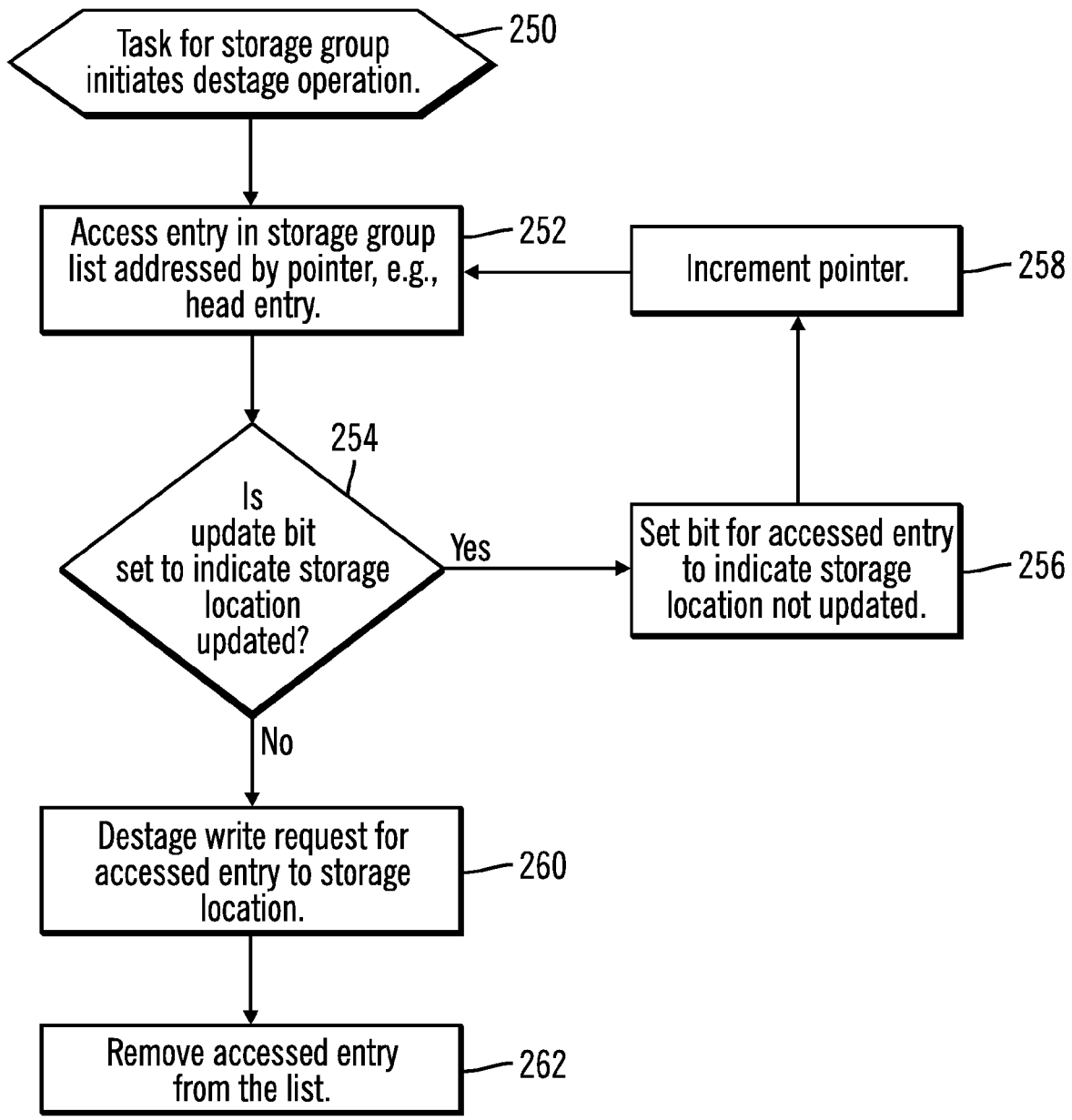
FIG. 7 illustrates an embodiment of operations to destage write requests from cache.

FIG. 7 illustrates an embodiment of operations performed by each task spawned for a storage group 22 to process destage requests. Upon a task initiating (at block 250) a destage operation, the task accesses (at block 252) an entry in the storage group list 16a, 16b . . . 16n addressed by the pointer 18a, 18b . . . 18n, e.g., head entry. If (at block 254) the update bit 76 for the entry 70 is set to indicate that the storage location 74 for the write request has recently been updated, then the task sets (at block 256) the bit 76 for the accessed entry 70 to indicate that the storage location 74 has not been updated and increments (at block 258) the pointer 18a, 18b . . . 18n to point to the next entry in the list 16a, 16b . . . 16n, which may comprise the entry having a storage location that is closest in spatial proximity to the storage location in the storage group 22 to which the previous write request was destaged. Control then proceeds back to block 252 to consider the next entry in the list 16a, 16b . . . 16n. If (at block 254) the update bit 76 is not set, then the task destages (at block 260) the write request for the accessed entry to the storage location 54 and removes (at block 262) the entry from the list 16a, 16b . . . 16n.

During operations, the cache manager 14 may perform another iteration of the operations of FIG. 6 to update the number of tasks for each storage group to take into account changed conditions in the cache, such as a change in the overall cache 10 occupancy or a change in the storage group cache occupancy 104 (FIG. 4) for each storage group. The cache manager 14 may perform the operations of FIG. 6 at predetermined time intervals or in a response to a percentage change in the overall or storage group cache occupancy.

With the operations of FIG. 7, the update bit 76 is used to provide temporal locality to leave a more recently accessed/updated entry in the cache 10 to improve the likelihood of a cache "hit", i.e., the likelihood that a subsequent read or write request will be directed to data already maintained in cache 10. Increasing the likelihood of "cache hits" reduces the need to perform a destage operation to destage a write request that is likely to be updated or modified in the cache 10. In this way, the storage group lists 16a, 16b . . . 16n provide for temporal and spatial locality of the write requests maintained in the cache 10 for each storage group.

Figure 8:
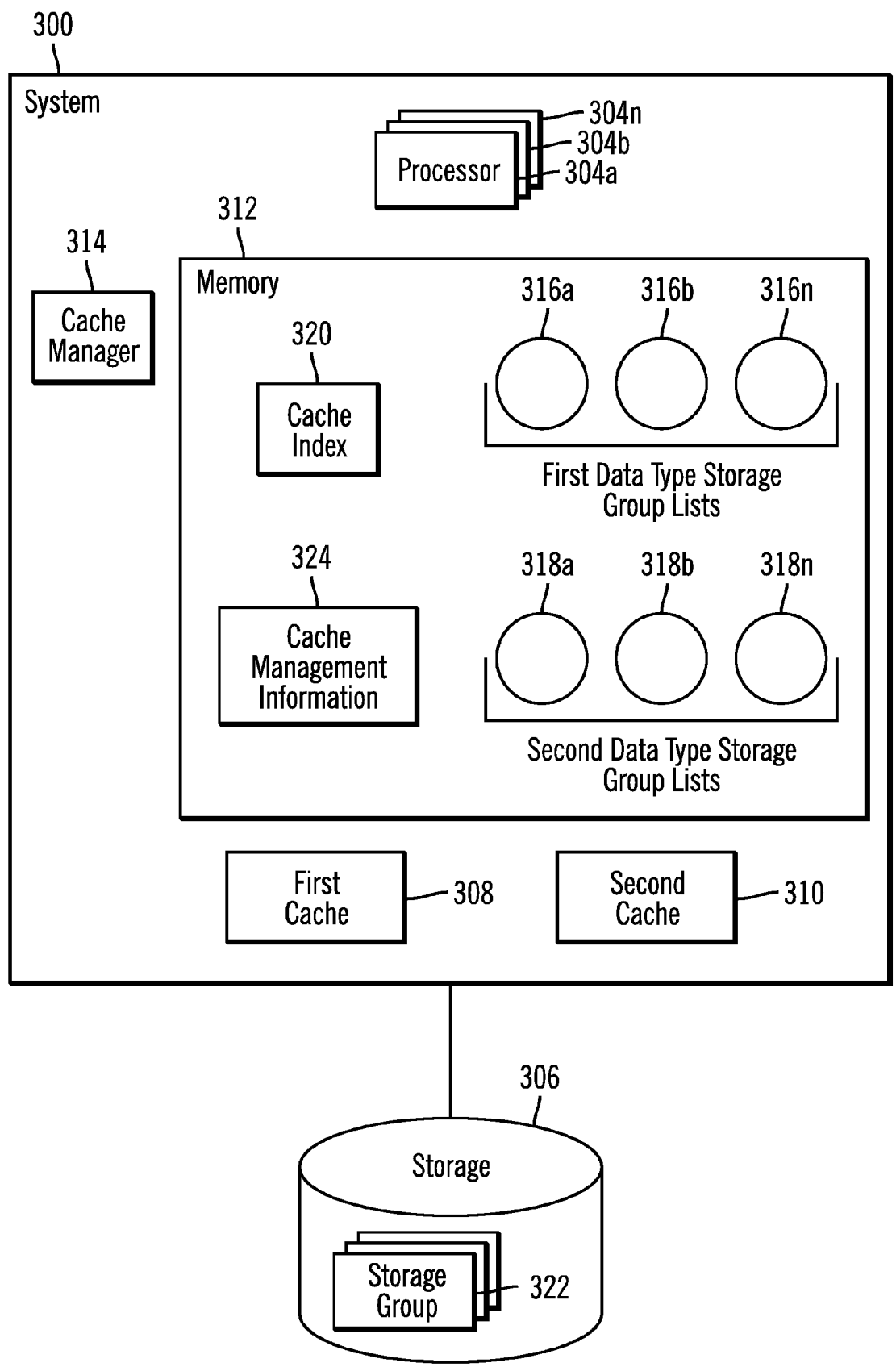
FIG. 8 illustrates an additional embodiment of a computing environment.

FIG. 8 illustrates an embodiment of a system 300, including processors 304a, 304b, 304n, a storage 306, memory 312, a cache manager 314, cache index 320, and storage groups 322, which may comprise the system 2, processors 4a, 4b . . . 4n, storage 6, memory 12, cache manager 14, cache index 20 and storage groups 22 described with respect to FIG. 1. The system 300 further includes two sets of storage group lists 316a, 316b . . . 316n and 318a, 381b . . . 318n. The storage group lists 316a, 316b . . . 316n are used by the cache manager 314 to manage the destaging of a first type of modified data stored in a first cache 308 to the storage groups 322 and the storage group lists 318a, 318b . . . 318n are used by the cache manager 314 to manage destaging of a second type of modified data stored in the second cache 310 to the storage groups 322. The storage group lists 316a, 316b . . . 316n and 318a, 381b . . . 318n may have the same data structure as the storage group lists 16a, 16b . . . 16n described with respect to FIG. 1. For instance, the entries in the storage group lists 316a, 316b . . . 316n or 318a, 318b . . . 318n may be may be sorted by the storage locations in the storage group 22 to which the write request represented by the entry is directed, i.e., to provide spatial locality.

In one embodiment, the first cache 308 may comprise a volatile memory device, such as a RAM, that stores unprotected modified data, and the second cache 312 may comprise a non-volatile memory device that stores protected write data to the storage 306. Further, the first cache 310 may have several times more storage capacity than the second cache 312.

The cache index 320 has information on write requests directed to the storage 306 maintained in the caches 308 and 310. The cache index 320 indicates whether data from a particular address or location in the storage 306 is identified in an entry in one of the storage group lists 316a, 316b . . . 316n or 318a, 318b . . . 381n. A storage address or location may comprise a track, block, page, or any other segment of data in the storage 6. The cache index 320 provides an index of storage addresses in the storage 306 to entries in one of the storage group lists 316a, 316b . . . 316n or 318a, 318b . . . 318n for first and second types of write requests, respectively, to the storage address.

The cache management information 324 may include information specific to both caches 308, 310, such as storage group information 90 for each storage group for each cache/type of modified data, where the storage group information 90 (FIG. 4) for the same storage group for the different caches/types of modified data may differ. Further, there may be two sets of cache information 10 (FIG. 5), one for the first cache 308 and another for the second cache 310. The cache low 112 and high 114 thresholds may differ for the different caches 308 and 310. For instance, if the first cache 308 has substantially greater storage capacity than the second cache 310, then the low 112 and high 114 thresholds for the first cache 308 may be correspondingly higher than those for the second cache 310. Further, the maximum number of tasks 102 may differ for the first 308 and second 310 caches, such that if the first cache 308 has significantly greater storage capacity than the second cache 310, then the maximum number of tasks 102 for the first cache 308 may be correspondingly higher than the maximum number of tasks 102 for the smaller second cache 310 to process a greater amount of data.

The cache manager 314 may spawn tasks, such as threads in the processors 304a, 304b . . . 304n, to process the storage group lists 316a, 316b . . . 316n or 318a, 318b . . . 318n, where a task would proceed sequentially through the entries in the storage group lists 316a, 316b . . . 316n or 318a, 318b . . . 318n to which the task is assigned in order to destage write requests from the first 308 or second 310 cache, respectively, to storage locations in the storages group 322 that are spatially proximate, i.e., a write request is destaged that is directed to a storage location or address in the storage group 322 that is spatially most proximate to the storage location/address of the previously destaged write request. For certain storage devices, such as hard disk drives or other magnetic storage media, data throughput is optimized by writing data that is the closest to the previously written data to minimize the distance that a write head mechanism or the storage media needs to move, e.g., seek or rotate, to access the next write address.

Figure 9:
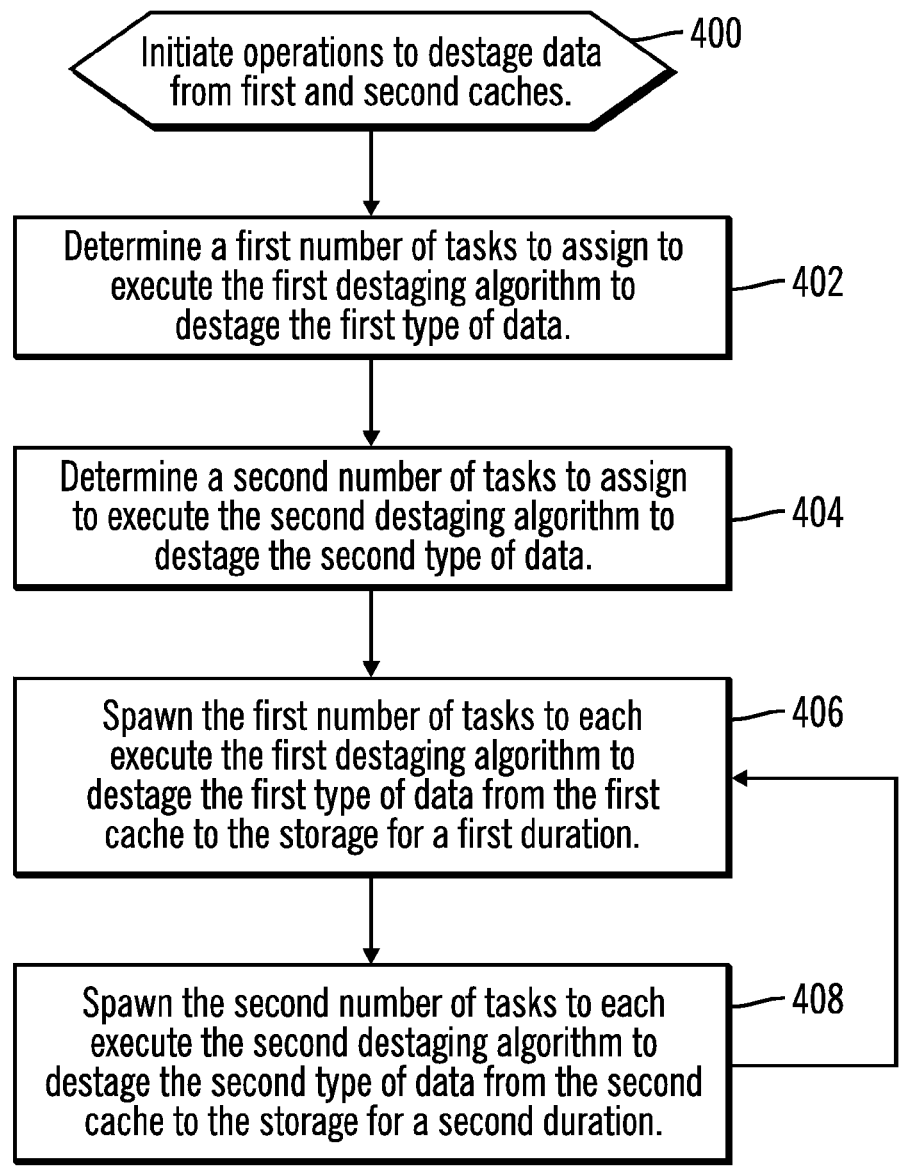
FIG. 9 illustrates an embodiment of operations to destage data from multiple caches.

FIG. 9 illustrates an embodiment of operations performed by the cache manager 314 to coordinate the destaging of writes from the first cache 308 and second cache 310. The data in both caches 308 and 310 is directed to the storage groups 322. Further, in one embodiment, a first destaging algorithm is used to destage the first type of data from the first cache 308 and a second destaging algorithm is used to destage the second type of data from the second cache 310. The first and second algorithms may comprise the same or different algorithms. In the embodiment of FIG. 8, the same algorithm of FIG. 7 is used to destage data from the first 308 and second 310 caches.

In one embodiment, at least one of the first and second algorithms comprises a spatial destaging algorithm, wherein a "spatial destaging algorithm" comprises a destaging algorithm that seeks to write data to sequential or proximate locations within storage groups to optimize throughput to the storage devices comprising the storage 306 by reducing the time needed to seek or rotate to write to a next storage location. Examples of spatial destaging algorithms include the WOW algorithm and the algorithms described with respect to FIGS. 6 and 7. The other destaging algorithm may also comprise a spatial destaging algorithm, or a different type of destaging algorithm, such as an algorithm that exploits temporal proximity, such as an LRU algorithm. In one embodiment, the spatial destaging algorithm may comprise the WOW algorithm, the algorithm described with respect to FIGS. 6 and 7 or other destaging algorithms that seek to exploit the spatial proximity of writes to improve the storage device throughput.

With respect to FIG. 9, upon initiating (at block 400) destage operations, the cache manager 314 determines (at block 402) a first number of tasks to assign to execute the first destaging algorithm to destage the first type of data from the first cache and determines (at block 404) a second number of tasks to assign to execute the second destaging algorithm to destage the second type of data. The cache manager 314 may determine different numbers of tasks for each storage group for each cache/data type. The cache manager 314 then spawns (at block 406) the first number of tasks to each execute the first destaging algorithm to destage the first type of data from the first cache 308 to the storage 306 for a first duration. After the first duration, the cache manager 314 spawns (at block 408) the second number of tasks to each execute the second destaging algorithm to destage the second type of data from the second cache 310 to the storage for a second duration. After the second duration, control returns back to block 312 to destage from the first cache 308.

With the operations of FIG. 9, sequentiality is maintained for the one or more spatial destaging algorithms ordering writes to destage to a storage group according to their storage location because the spatial destaging algorithm operates during a duration uninterrupted by the other destaging algorithm, which may organize and submit writes to storage locations that are not spatially proximate with respect the writes being sent by the other destaging algorithm. The described operations of FIG. 9 prevent one destaging algorithm from introducing spatial randomness into the write stream to the storage device that interferes with the spatial proximity of the writes being placed into the write stream by the other storage device.

The first and second durations may comprise a time period, e.g., number of clock cycles, or a number of destage operations.

Figure 10:
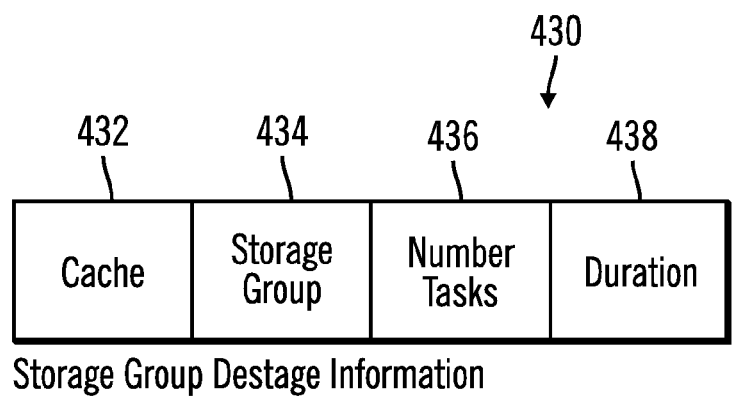
FIG. 10 illustrates an embodiment of storage group destage information used when destaging data from multiple caches.

FIG. 10 illustrates an embodiment of storage group destage information 430 maintained for each cache/data type that is used by the cache manager 314 to manage the execution of the destage algorithms used to destage data from the first 308 and second 310 caches. The storage group destage information 430 includes: a cache 432, identifying the cache 308, 310 to which the information applies; a storage group 434 to which the information applies; a number of tasks 436 used to execute the destage algorithm to destage writes from the identified cache 432 to the identified storage group 434; and a duration 438 during which the number of tasks 436 destages modified data from the identified cache 432 to the identified storage group 434. In one embodiment, the cache manager 314 may maintain different numbers of tasks 436 and durations 438 for each storage group 322 and cache 308, 310. Alternatively, a same number of tasks 436 and duration 438 may be used for more than one or all storage groups for one cache 308, 310.

Figure 11:
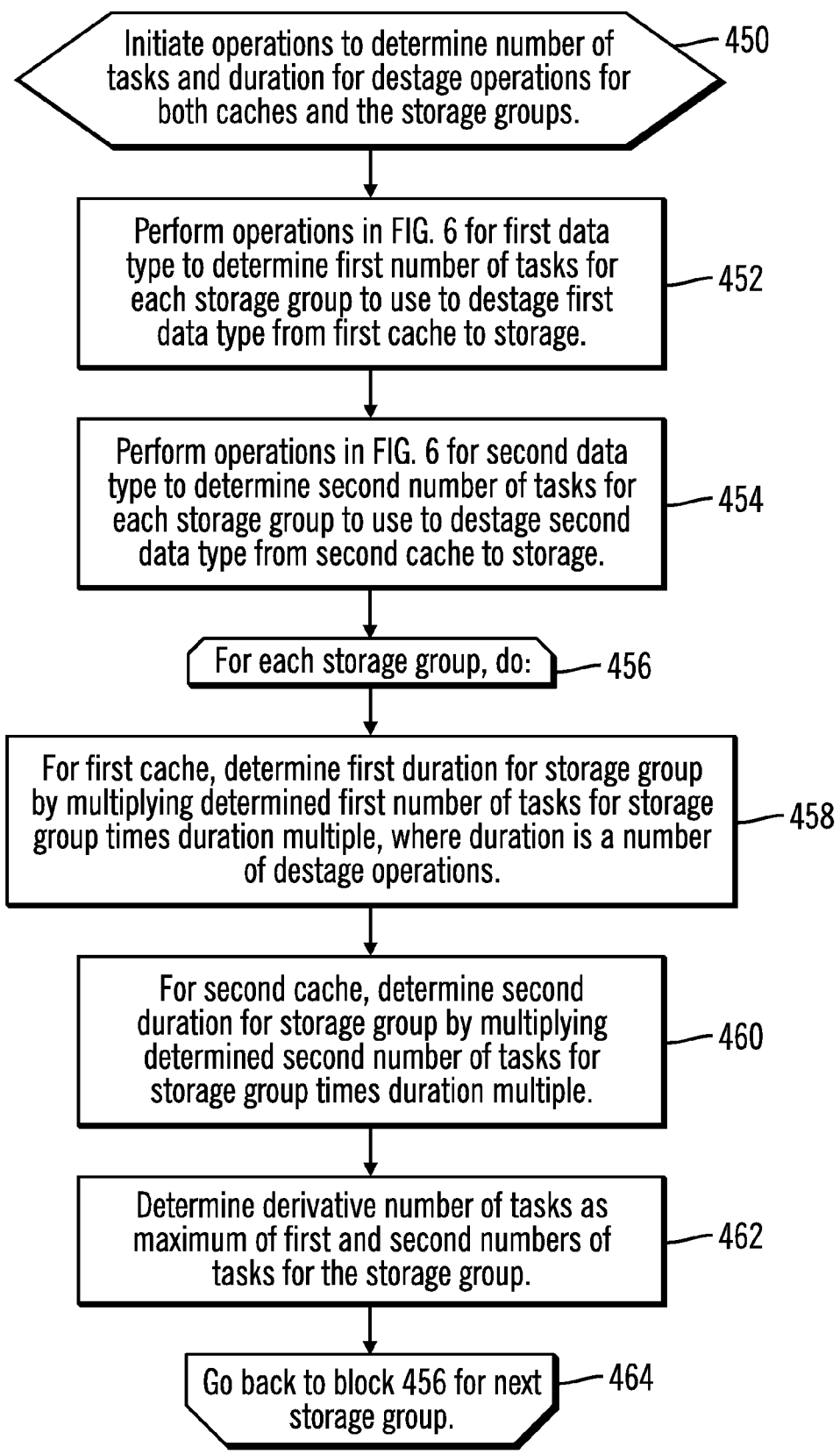
FIG. 11 illustrates an embodiment to determine a number of tasks and duration for destage operations when destaging from multiple caches.
Figure 12:
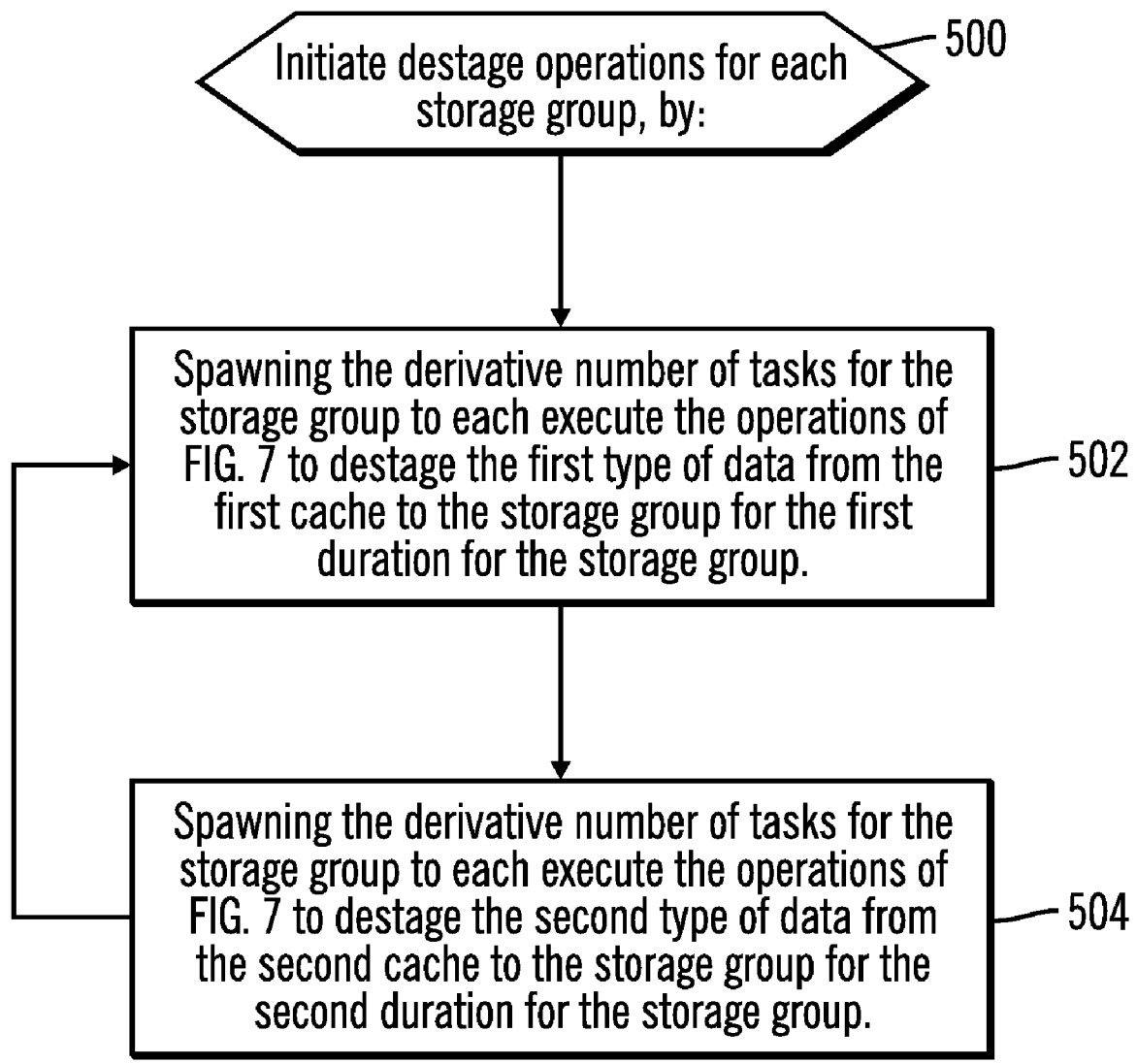
FIG. 12 illustrates an embodiment of operations to destage write requests to multiple caches.

FIGS. 11 and 12 illustrate an embodiment of operations performed by the cache manager 314 in an embodiment where the destage algorithms of FIGS. 7 and 8 are used to destage data from both the first 308 and second 310 caches using the first and second storage group lists 316a, 316b ... 316n or 318a, 318b ... 318n, respectively, as shown in FIG. 1.

FIG. 11 illustrates an embodiment of operations performed by the cache manager 314 to determine the storage group destage information 430 (FIG. 10) for each cache/data type. Upon initiating (at block 450) operations to determine the number of tasks 436 and duration 438 for destage operations for both caches 308, 310 and the storage groups 322, the cache manager 314 performs (at block 452) the operations in FIG. 6 for the first cache 308/data type to determine a number of tasks 436 for each storage group 322 to use to destage the first data type from the first cache 308 to one storage group 434. Similarly, the cache manager 314 performs (at block 454) the operations in FIG. 6 for the second data type to determine the number of tasks 436 for each storage group to use to destage the second data type from the second cache 310 to the storage group 434.

The cache manager 314 performs a loop of operations at blocks 456 through 464 for each storage group 322. The operations at blocks 458 through 462 performed for the different storage groups may be performed in parallel or sequentially with respect to operations performed for different storage groups or for the same storage group. At block 458, the cache manager 314 determines for the first cache 308/first data type, a first duration 438 for the storage group 434 by multiplying the determined number of tasks 436 for the storage group and cache 308 times a duration multiple, where the duration is a number of destage operations to perform. Similarly, for the second cache 310, the cache manager 314 determines (at block 460) a second duration 438 for the storage group 434 by multiplying the determined number of tasks 436 for the storage group and cache 310 times the duration multiple. The cache manager 314 then determines (at block 462) a derivative number of tasks as the maximum of the number of tasks for the first 308 and second 310 cache for the storage group. In one embodiment, the cache manager 314 may use the same derivative number of tasks to destage data from both the first 308 and second 310 cache for one storage group to apply a uniform destage load for the storage group. Use of a uniform destage load across the caches 308, 310 improves the average response time of the storage device. Alternative techniques, other than a maximum, may be used to determine the derivative number of tasks to use to destage for both caches to one storage group.

FIG. 12 illustrates an embodiment of operations performed by the cache manager 314 to destage the data from the caches 308, 310 using the determined storage group destage information 430 (FIG. 10). For each storage group 322 (at block 500), the cache manager 314 spawns (at block 502) the derivative number of tasks for the storage group so each spawned task executes the operations of FIG. 7 to destage the first type of data from the first cache 308 to the storage group for the first duration 438 for the storage group 434 and cache 432. After the first duration, the cache manager 314 spawns (at block 504) the derivative number of tasks for the storage group so each spawned task executes the operations of FIG. 7 to destage the second type of data from the second cache 310 to the storage group for the second duration 438 for the storage group 434 and cache 432.

At some point, in response to an event, the cache manager 314 may again perform the operations of FIG. 11 to recalculate the storage group destage information 430 for each cache 308, 310 to provide updated number of tasks 436 and duration 438 information to take into account any changes to the cache 308, 310 and storage group occupancy. For instance, in one embodiment, the event triggering the recalculation of the storage group destage information 430 and operations of FIG. 11 may comprise the expiration of a time interval or a change by a certain amount or percentage in the overall cache occupancy for one or both of the caches 308, 310 or the cache occupancy for one or more storage groups.

With the described embodiments, destaging for each cache is performed for a duration, such as for a number of destages or period of time, before switching to destaging from another cache, so that data from one cache is being destaged at a time. This allows a spatial destaging algorithm to be used to destage write data from one cache to proximate spatial locations without destages from another cache introducing a random pattern of writes into the write stream to the storage device. Arbitrating between writes from different caches maintains the spatial proximity of writes for the one or more spatial destaging algorithms and improves write throughput and performance at the storage device.

Additional Embodiment Details

The described operations may be implemented as a method, apparatus or article of manufacture using standard programming and/or engineering techniques to produce software, firmware, hardware, or any combination thereof. The described operations may be implemented as code maintained in a "computer readable medium", where a processor may read and execute the code from the computer readable medium. A computer readable medium may comprise media such as magnetic storage medium (e.g., hard disk drives, floppy disks, tape, etc.), optical storage (CD-ROMs, DVDs, optical disks, etc.), volatile and non-volatile memory devices (e.g., EEPROMs, ROMs, PROMs, RAMs, DRAMs, SRAMs, Flash Memory, firmware, programmable logic, etc.), etc. The code implementing the described operations may further be implemented in hardware logic (e.g., an integrated circuit chip, Programmable Gate Array (PGA), Application Specific Integrated Circuit (ASIC), etc.). Still further, the code implementing the described operations may be implemented in "transmission signals", where transmission signals may propagate through space or through a transmission media, such as an optical fiber, copper wire, etc. The transmission signals in which the code or logic is encoded may further comprise a wireless signal, satellite transmission, radio waves, infrared signals, Bluetooth, etc. The transmission signals in which the code or logic is encoded is capable of being transmitted by a transmitting station and received by a receiving station, where the code or logic encoded in the transmission signal may be decoded and stored in hardware or a computer readable medium at the receiving and transmitting stations or devices. An "article of manufacture" comprises computer readable medium, hardware logic, and/or transmission signals in which code may be implemented. A device in which the code implementing the described embodiments of operations is encoded may comprise a computer readable medium or hardware logic. Of course, those skilled in the art will recognize that many modifications may be made to this configuration without departing from the scope of the present invention, and that the article of manufacture may comprise suitable information bearing medium known in the art.

In the described embodiments, the data structures or lists used to store the entries for the data in the cache comprised circular lists or clocks. In alternative embodiments, additional suitable data structures may be used to store entries of information to manage the data in the cache. Moreover, in the described embodiments, the data structures used to store the entries were of the same type. In an alternative embodiment, the multiple data structures used to store the cache entries may be of mixed types.

In the described embodiments, different types of data are destaged from different caches. In an alternative embodiment, the different types of data may be managed separately in a single cache.

In the described embodiments of FIGS. 8-12, destaging was described with respect to two caches 308, 310. In additional embodiments, there may be more than two caches. In such case, the cache manager would destage data from each of the caches for a determined duration before alternating to destaging from one of the other caches. Further, in certain embodiments, the cache manager may maintain a storage group list, such as storage group lists 316a, 316b . . . 316n or 318a, 318b . . . 318n, for each of the three or more caches, where each of the caches may maintain a different type of data.

In the described embodiments of FIGS. 8-12, the different types of data comprised different types of modified data, such as write data protected in a non-volatile memory device and write data unprotected in a volatile memory device. In alternative embodiments, the caches may also maintain further different types of modified data.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

The variables "n" and "m" when used to represent a variable number of an element may indicate any number of instances of the element, and may indicate different integer numbers when used with different elements.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The data structures of FIGS. 2-5 and 10 show certain information. However, the information shown in the data structures of FIGS. 2-5 and 10 may be maintained in fewer or more data structures in a different format and combinations, along with additional information.

The illustrated operations of FIGS. 6, 7, 9, 11, and 12 show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching.

It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. An article of manufacture comprising a computer readable storage medium having code executed by a processor to communicate with a storage and to perform operations, the operations comprising:

using a first destaging algorithm to destage a first type of data from a first cache to storage groups in the storage for a first duration, wherein a plurality of storage groups are configured in the storage, wherein the first destaging algorithm comprises a spatial destaging algorithm that performs determining for each of a plurality of the storage groups, a number of tasks to assign to one of the storage groups based on a percentage occupancy of the first type of data in the first cache to write to the storage group, wherein each task assigned to one storage group destages the first type of data from the first cache to the storage group; and using a second destaging algorithm to destage a second type of data from a second cache to the storage groups in the storage for a second duration.

2. The article of manufacture of claim 1, wherein the number of tasks to assign to one storage group is based on the percentage occupancy of the first type of data in the first cache, high and low thresholds with respect to the storage group for the first type of data and a total occupancy of the first cache.

3. The article of manufacture of claim 1, wherein the second destaging algorithm implements the spatial destaging algorithm implemented by the first destaging algorithm to determine a number of tasks to assign to the storage groups to destage the second type of data from the second cache to the storage groups.

4. The article of manufacture of claim 3, wherein there are first and second durations for the first and second types of data for each of the plurality of storage groups, and wherein for each storage group of the plurality of storage groups, the operations further comprise:

using the first destaging algorithm to determine a first number of tasks to use to destage the first type of data to the storage group, wherein the first duration for the storage group is calculated using the determined first number of tasks for the storage group; and using the second destaging algorithm to determine a second number of tasks to use to destage the second type of data to the storage group, wherein the second duration for the storage group is calculated using the determined second number of tasks for the storage group.

5. The article of manufacture of claim 4, wherein determining the first number of tasks for one storage group further comprises using a high and low thresholds for the storage group and a percentage occupancy of the first type of data for the storage group in the first cache, and wherein determining the second number of tasks for one storage group further comprises using a high and low thresholds for the storage group and a percentage occupancy of the second type of data for the storage group in the second cache.

6. The article of manufacture of claim 5, wherein the high and low thresholds used for the first cache and first destaging algorithm are higher than the high and low thresholds used by the second cache, and wherein the first cache has greater storage capacity than the second cache.

7. The article of manufacture of claim 4, wherein the operations further comprise:

periodically recalculating the first and second number of tasks and the first and second durations to use in response to an event.

8. The article of manufacture of claim 7, wherein the storage comprises at least one Redundant Array of Inexpensive Disks (RAID) array and wherein each storage group comprises a RAID rank.

9. A system coupled to a storage, comprising:

a first cache and a second cache, wherein a plurality of storage groups are configured in the storage;

a cache manager coupled to the first cache and the second cache that performs operations, the operations comprising:

using a first destaging algorithm to destage a first type of data from the first cache to the storage groups in the storage for a first duration, wherein the first destaging algorithm comprises a spatial destaging algorithm that performs determining for each of a plurality of the storage groups, a number of tasks to assign to one of the storage groups based on a percentage occupancy of the first type of data in the first cache to write to the storage group, wherein each task assigned to one storage group destages the first type of data from the first cache to the storage group; and using a second destaging algorithm to destage a second type of data from the second cache to the storage groups in the storage for a second duration.

10. The system of claim 9, wherein the number of tasks to assign to one storage group is based on the percentage occupancy of the first type of data in the first cache, high and low thresholds with respect to the storage group for the first type of data and a total occupancy of the first cache.

11. The system of claim 9, wherein the second destaging algorithm implements the spatial destaging algorithm implemented by the first destaging algorithm to determine a number of tasks to assign to the storage groups to destage the second type of data from the second cache to the storage groups.

12. The system of claim 11, wherein there are first and second durations for the first and second types of data for each of the plurality of storage groups, and wherein for each storage group of the plurality of storage groups, the operations further comprise:

using the first destaging algorithm to determine a first number of tasks to use to destage the first type of data to the storage group, wherein the first duration for the storage group is calculated using the determined first number of tasks for the storage group; and using the second destaging algorithm to determine a second number of tasks to use to destage the second type of data to the storage group, wherein the second duration for the storage group is calculated using the determined second number of tasks for the storage group.

13. The system of claim 12, wherein determining the first number of tasks for one storage group further comprises using a high and low thresholds for the storage group and a percentage occupancy of the first type of data for the storage group in the first cache, and wherein determining the second number of tasks for one storage group further comprises using a high and low thresholds for the storage group and a percentage occupancy of the second type of data for the storage group in the second cache.

14. A method, comprising:

using a first destaging algorithm to destage a first type of data from a first cache to storage groups in the storage for a first duration, wherein a plurality of storage groups are configured in storage, wherein the first destaging algorithm comprises a spatial destaging algorithm that performs determining for each of a plurality of the storage groups, a number of tasks to assign to one of the storage groups based on a percentage occupancy of the first type of data in the first cache to write to the storage group, wherein each task assigned to one storage group destages the first type of data from the first cache to the storage group; and using a second destaging algorithm to destage a second type of data from a second cache to the storage groups in the storage for a second duration.

15. The method of claim 14, wherein the number of tasks to assign to one storage group is based on the percentage occupancy of the first type of data in the first cache, high and low thresholds with respect to the storage group for the first type of data and a total occupancy of the first cache.

16. The method of claim 14, wherein the second destaging algorithm implements the spatial destaging algorithm implemented by the first destaging algorithm to determine a number of tasks to assign to the storage groups to destage the second type of data from the second cache to the storage groups.

17. The method of claim 16, wherein there are first and second durations for the first and second types of data for each of the plurality of storage groups, and wherein for each storage group of the plurality of storage groups, performing:

using the first destaging algorithm to determine a first number of tasks to use to destage the first type of data to the storage group, wherein the first duration for the storage group is calculated using the determined first number of tasks for the storage group; and using the second destaging algorithm to determine a second number of tasks to use to destage the second type of data to the storage group, wherein the second duration for the storage group is calculated using the determined second number of tasks for the storage group.

18. The method of claim 17, wherein determining the first number of tasks for one storage group further comprises using a high and low thresholds for the storage group and a percentage occupancy of the first type of data for the storage group in the first cache, and wherein determining the second number of tasks for one storage group further comprises using a high and low thresholds for the storage group and a percentage occupancy of the second type of data for the storage group in the second cache.

* * * * *